Aug. 9, 1927.

J. A. COOK 1,638,680

POWER ATTACHMENT FOR MOWERS

Filed Sept. 8, 1926     3 Sheets-Sheet 1

WITNESSES

INVENTOR
John A. Cook
BY

ATTORNEYS

Aug. 9, 1927.

J. A. COOK 1,638,680

POWER ATTACHMENT FOR MOWERS

Filed Sept. 8, 1926

WITNESSES

INVENTOR
John A. Cook
BY
ATTORNEYS

Patented Aug. 9, 1927.

1,638,680

UNITED STATES PATENT OFFICE.

JOHN A. COOK, OF FRANKLIN FURNACE, NEW JERSEY.

POWER ATTACHMENT FOR MOWERS.

Application filed September 8, 1926. Serial No. 134,288.

This invention relates to a power attachment for mowers and has for an object to provide an improved construction wherein a mowing machine may be operatively connected with a Ford automobile so that as the automobile parts are caused to function the mowing machine will mow forward and function in the usual manner.

Another object of the invention is to provide a number of attachments for connecting an automobile to a mowing machine with the parts so formed and positioned that the automobile may be caused to function in the usual manner from the seat at the rear of the mower.

In the accompanying drawings—

Referring to the accompanying drawings by numerals, 1 indicates a mower of any desired kind, as for instance, a "Deering mower." Associated with this mower is a Ford automobile 2 which is mounted on the mower in such a manner that upon the operation of the mechanism of the automobile the mower and automobile will move forwardly and the mower will be caused to function properly. A number of attachments and changes have been provided to secure this result.

Figure 1:
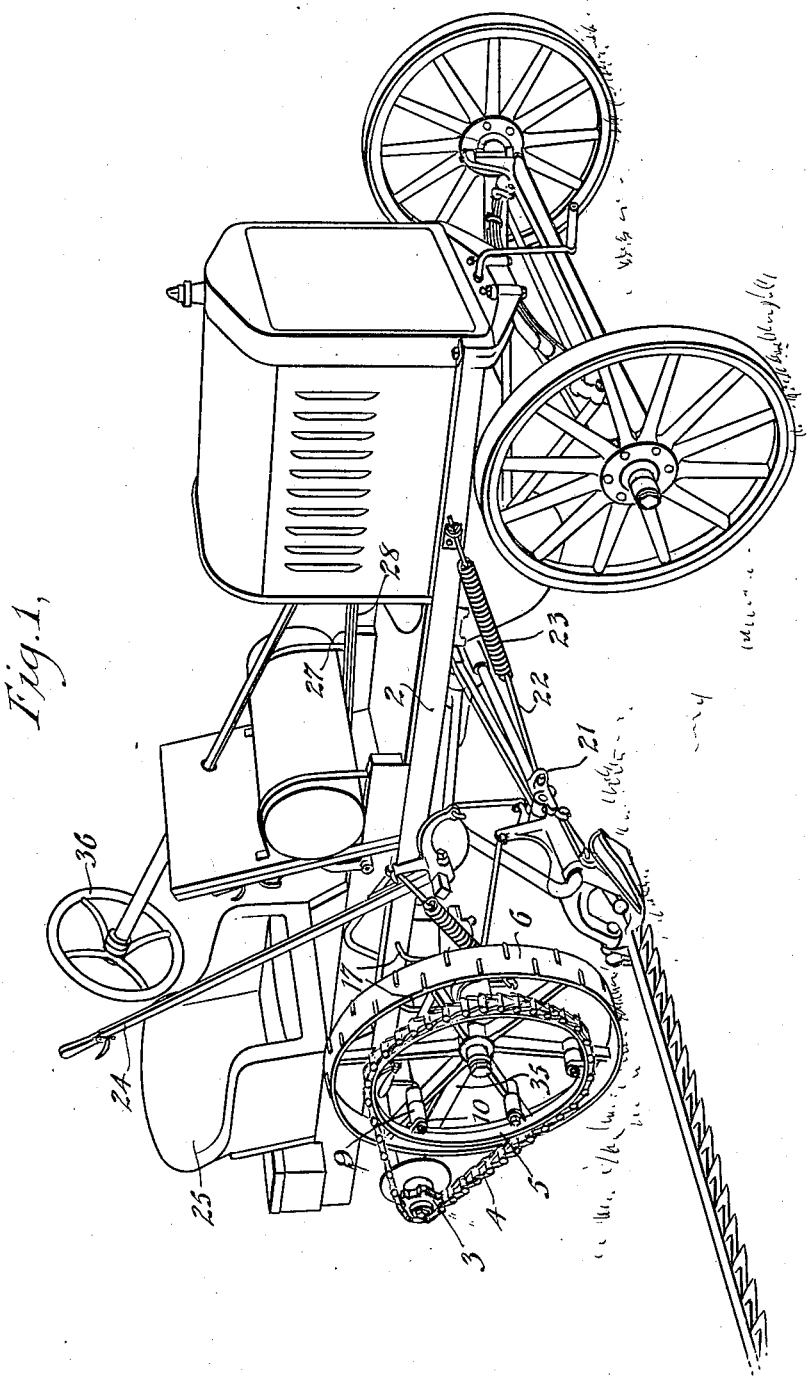
Figure 1 is a perspective view of the principal parts of a mowing machine with a Ford automobile hooked thereto.

As indicated in the drawings, the rear wheels of the automobile 2 have been removed and a sprocket wheel 3 provided at each end of the axle, said sprocket wheels accommodating chains 4 and said chains in turn passing over rods or sprocket rings 5 secured to the traction wheels 6. The traction wheels 6 are specially made wheels and are adapted to be substituted for the original wheels on the mower. This is necessary in order that the various spokes 7 of the wheels 6 may be provided with tubular enlargements 8 receiving the cylindrical members 9 which are secured in the tubular enlargements 8 in any desired manner and to which the rings 5 are bolted. As indicated in Figure 1, the rings 5 shown therein are provided with an ear or lug 10 for each of the cylindrical members 9. These cylindrical members are preferably solid metal and are secured in the tubular members 8 by spot welding or in any other desired manner.

Figure 3:
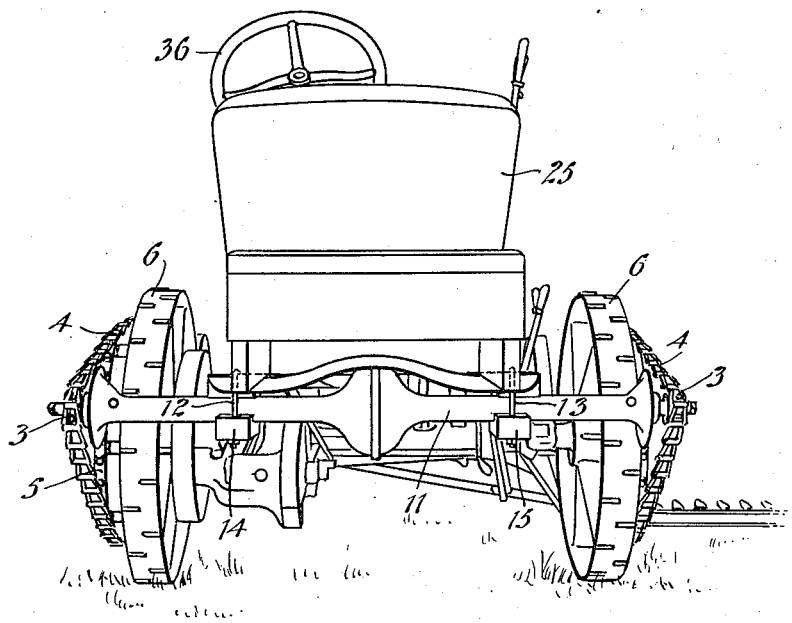
Figure 3 is a rear view of the structure shown in Figure 1.
Figure 4:
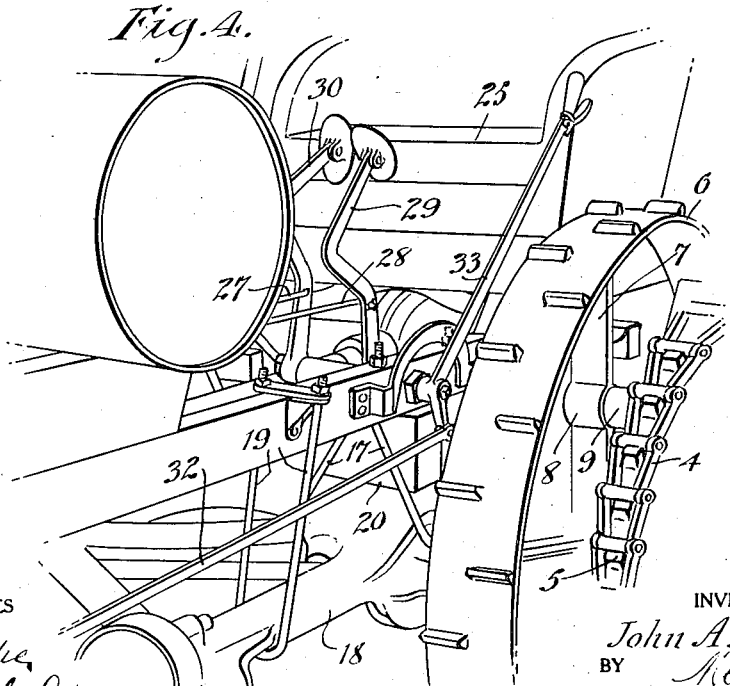
Figure 4 is an enlarged fragmentary perspective view showing a plurality of hangers and associated parts forming certain features of the invention.

As indicated in Figure 3, the chassis of the automobile is bolted firmly to the rear axle housing 11 by suitable U-bolts 12 and 13, each of said bolts passing through part of the chassis of the automobile and through suitable blocks 14 and 15. The chassis of the automobile is also secured to the mower 1 for instance, by a hanger 17 on each side, said hangers passing under the rear axle of the mower. The upper parts of these hangers extend through part of the chassis and are secured thereto in any desired manner, as for instance, by nuts. The forwardly extending shaft casing 18 of the mower is supported by a suitable hanger 19 as shown in Figure 4. Immediately above the axle of the mower are arranged one or more blocks 20 of wood or other material whereby the hangers 17 firmly clamp the mower and the automobile together. The mower is provided with the usual hitch lug 21 (Figure 1) but instead of hitching horses to this lug, the same is connected to the automobile through a suitable rod 22 and a spring structure 23 whereby a yielding pull is given. The various parts of the mower not specially mentioned are of the usual construction and function in the usual manner including the lever 24. It will be noted that this lever is near the driver's seat 25 whereby parts of the mower may be shifted in the usual manner as desired.

The Ford automobile controlling members are normally near the hood of the engine but in order to make them convenient from the driver's seat 25, the steering rod has been lengthened and also the throttle rods have been lengthened so that the steering wheel 26 will be near the seat 25. Likewise rods 27 and 28 are connected to the brake and clutch pedal and also connected to similar pedals 29 and 30 near seat 25. An emergency brake structure 31 is likewise connected through rod 32 to a similar lever and associated parts 33. By setting back the various controls of the automobile as just described, the action of the automobile may be controlled easily from seat 25 and as the various levers of the mower are already near this seat, the mower may be properly shifted whenever desired. In order that the wheel 26 may extend to the rear, a wedge 34 is placed beneath the bracket which supports the forward end of the steering rod. This positioning of the wedge at this point permits the angle of the rod to be changed to that shown in Figure 2 without changing any of the steering mechanism. Also, in order to brace the rear axle and associated parts of the Ford and the mower, suitable bracing bars 35 are provided, said bars being connected in any suitable manner with the axle housing of the automobile and the axle housing of the mower.

Figure 2:
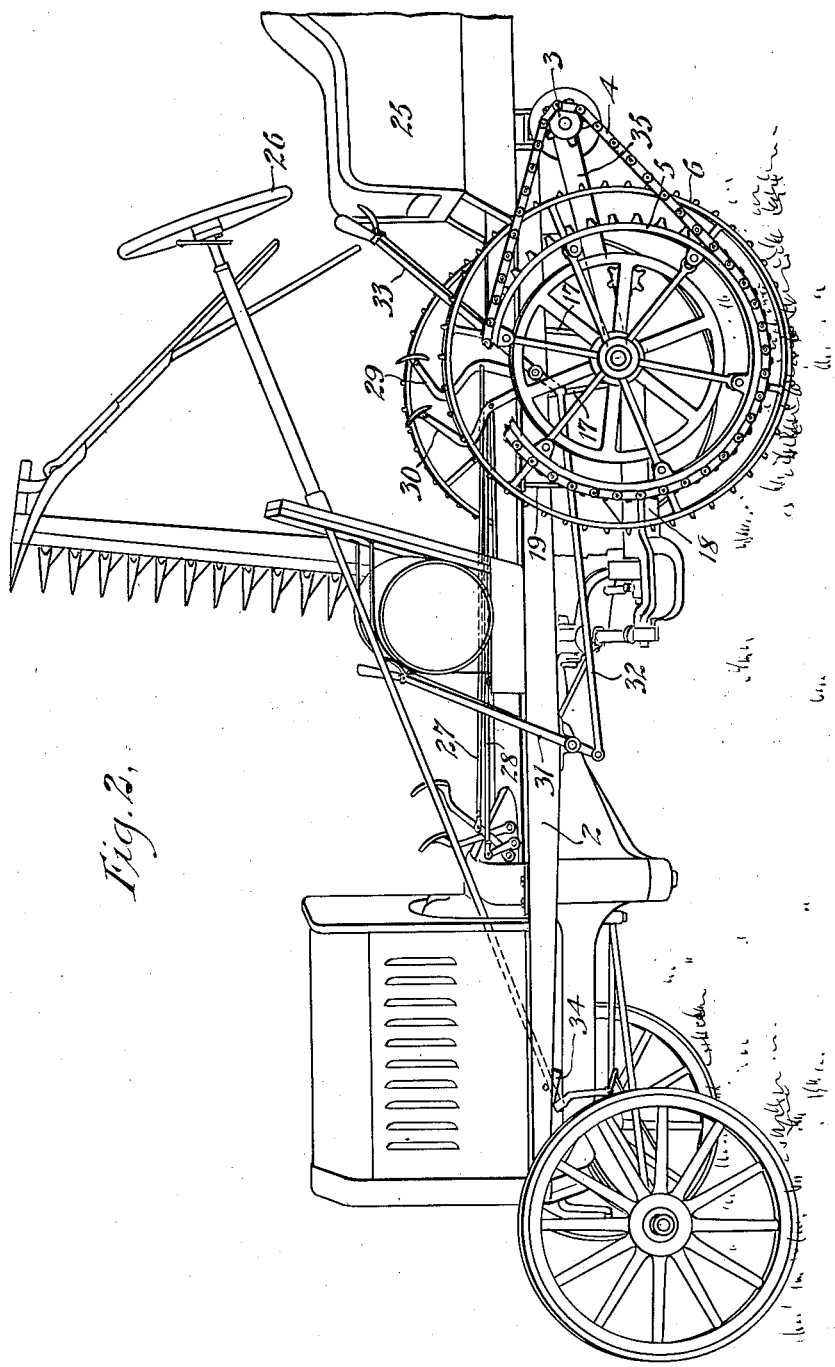
Figure 2 is a side view of the structure shown in Figure 1 with a sickle and associated parts moved to an upper position.

When the device is to be used, the parts are moved to the position shown in Figure 1 and the engine of the automobile started. When the clutch of the automobile is left in, power will be transmitted from the rear axle of the automobile to chains 4 and associated parts to the wheels of the mower and said wheels will drive the mowing mechanism in the usual manner at the same time propel the entire device. The front wheels of the automobile are shifted in the usual manner by the usual steering wheel 36. When it is desired to transport the device from one place to another without using the sickle, lever 24 is operated and the sickle moved to an upper position as shown in Figure 2 and then the rear wheels operated for driving the device.

What I claim is:

In a combined mowing machine and automobile, means for connecting the driving mechanism of the automobile with the traction wheels of the mowing machine whereby the automobile will drive the mowing machine, said means including a specially constructed traction wheel for the mowing machine, said traction wheel including a member for gripping the ground, a plurality of spokes, each spoke having an enlarged tubular section, and means for clamping a sprocket wheel to said enlarged tubular section.

JOHN A. COOK.